June 14, 1938.                C. J. OXFORD ET AL                2,120,622
                                  BORING TOOL
                              Filed Sept. 14, 1936
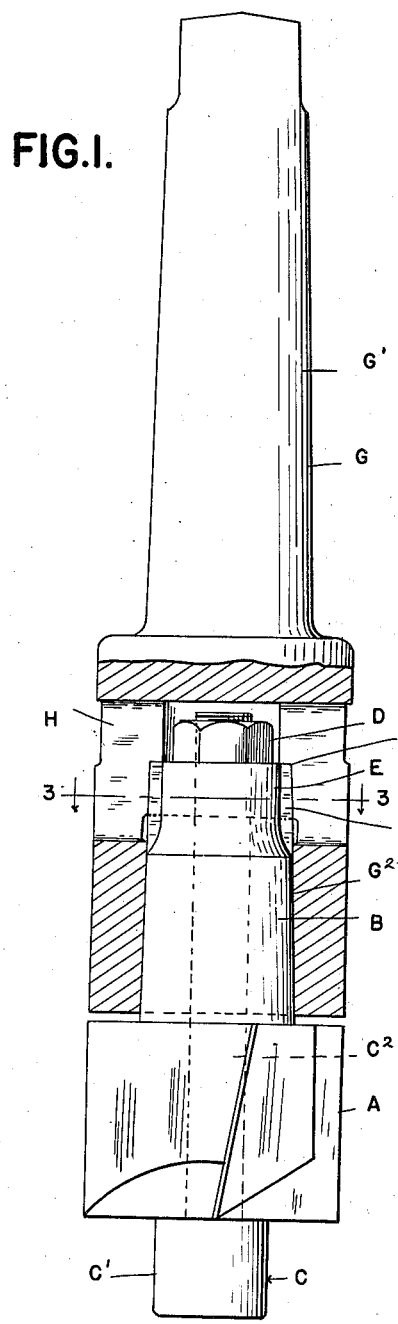
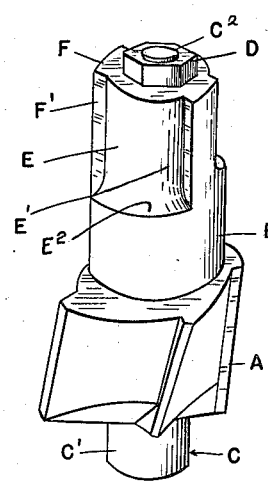
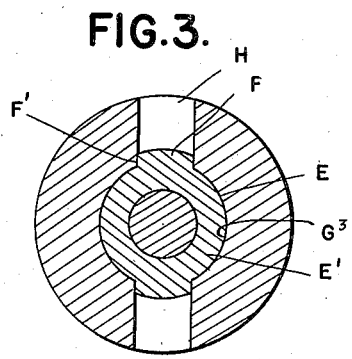
INVENTORS
CARL J. OXFORD
JOHN NELSON
BY
ATTORNEYS Patented June 14, 1938

2,120,622

UNITED STATES PATENT OFFICE 2,120,622

BORING TOOL

Carl J. Oxford, Detroit, and John Nelson, Berkley, Mich., assignors to National Twist Drill & Tool Company, Detroit, Mich., a corporation of Michigan Application September 14, 1936, Serial No. 100,774

2 Claims. (Cl. 279—9)

The invention relates to rotary tools more particularly designed for use in counterboring and it is the object of the invention to obtain a construction which can be easily manufactured and which possesses a high degree of strength, particularly in the transmission of torsional stresses. To this end the invention consists in the construction as hereinafter set forth.

In the drawing:

Figure 1 is a sectional elevation of my improved counterboring tool in engagement with the socket or holder therefor;

Figure 2 is a perspective view of the tool detached from the socket;

Figure 3 is a cross section on line 3—3 of Figure 1.

In the construction of counterboring tools it is usual to provide an end mill or cutter having a projecting pilot for properly centering it in relation to the hole to be counterbored and further provided with a shank for engaging the socket or holder through which the tool is driven. In the performance of its work a considerable amount of torsional stress is transmitted between the holder and tool and it is, therefore, necessary to provide a coupling means therebetween of sufficient strength to safely carry this stress. This is sometimes accomplished by providing the shank of the tool with a flat tang at its upper end for engaging a correspondingly shaped recess in the socket, but on account of the relatively small cross sectional area such tangs are frequently twisted or sheared off. Furthermore, it is customary to form the pilot as a separate member from the cutting tool and to provide the same with a shank passing through an axial bore in the tool and its shank being secured at its upper end by a nut or screw. This further restricts the area available for a driving tang or lug at the end of the tool shank.

The present invention is designed to overcome these difficulties by dispensing with the tang at the upper end of the tool shank and by providing driving shoulders or splines along a portion of the side of the shank. In order, however, to accurately center the tool, it is desirable to have at least a portion of the shank of a slightly conical or tapered form to engage a correspondingly tapered socket. It is also desirable to avoid the cutting away of the metal of the shank to any greater extent than absolutely necessary. This we have accomplished by the following construction.

A is the counterboring tool which as shown is in the form of an end mill being provided with a slightly tapered or conical shank B. C is the pilot member having a cylindrical head portion C' and a shank C² of smaller diameter which passes through an axial bore in the tool A. The upper end portion of this shank is threaded for engagement with a nut D or other suitable means for securely holding the pilot in position. To provide a driving connection between the shank B and its socket the upper end portion of said shank has comparatively shallow recesses E milled in diametrically opposite segments thereof. The bottoms of these recesses are cylindrical segments E' which are parallel to and concentric with the axis of the shank. Between the opposite recesses are portions F which form splines having driving shoulders F' on opposite sides thereof. These shoulders are comparatively narrow on account of the shallowness of the recesses E, but are of sufficient length to give the required contact area.

The socket G may be of any suitable construction being preferably provided with a tapering shank G' for fitting into the chuck of the drill press or other driver. This socket has a tapering recess G² for engaging the tapering portion of the shank B and is further provided with a cylindrical portion G³ which is of a diameter corresponding to the diameter of the cylindrical segments E' of the tool. Extending transversely through this socket and the cylindrical portion G³ thereof is an elongated slot H which is of a width exactly corresponding to the width of the splines F. Thus when the shank B is inserted into the socket G the splines F will pass into the slot H, while the cylindrical segments E' will extend within the cylindrical portion G³ and the tapered portion of the shank will fit within the tapered portion G² of the socket. The recesses E are tapered at their end portions E² to gradually merge into the tapered portion of the shank.

The construction as above described, is very easily manufactured for the recesses E in the shank B can be readily formed by milling operations, and the slot H extending completely through the socket forms the ways for receiving the splines F and provides the driving shoulders accurately positioned for engaging the shoulders F' on the shank. Due to the fact that the recesses E are very shallow, the strength of the shank for transmission of torsional stresses is not greatly impaired, while the stresses transmitted through the splines F are in shear instead of being torsional as with a driving tang. Consequently, there is ample strength in the structure for withstanding the stresses to which it is subjected.

What we claim as our invention is:

1. A boring tool provided with a tapering shank and having comparatively shallow spaced recesses on the sides of the end portion of said shank leaving a splined portion therebetween the ends of which merge into the recessed portion, a central core of but slightly less cross sectional area than the unrecessed shank for carrying torque stresses from said splines; in combination with a socket member having a portion with a tapering bore for engaging the tapering portion of said shank and a portion with a bore of smaller diameter for receiving said central core, said socket also having a transversely extending slot intersecting both bores of a width corresponding to the width of said spline adapted to receive the same and form driving shoulders therefor.

2. A boring tool provided with a tapering shank and also having comparatively shallow recesses on the sides of the end portion of said shank leaving splined portions therebetween the ends of which merge into the unrecessed portion, and a central core of but slightly less cross sectional area than the unrecessed shank portion for carrying torque stresses from said splines; in combination with a socket member having a portion with a tapering bore for engaging the tapering portion of said shank and a portion with a bore of smaller diameter for receiving said central core, said socket also having a transverse slot intersecting both bores extending upon opposite sides thereof and of a width corresponding to the width of said splines adapted to receive the same and form driving shoulders therefor.

CARL J. OXFORD.
JOHN NELSON.